(No Model.) 8 Sheets—Sheet 1.
G. F. GIESECKE.
TYPE FINISHING MACHINE.
No. 540,656. Patented June 11, 1895.
Fig. 1.     Fig. 2.     Fig. 3.
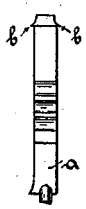
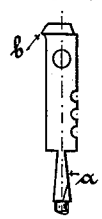
Fig. 4.
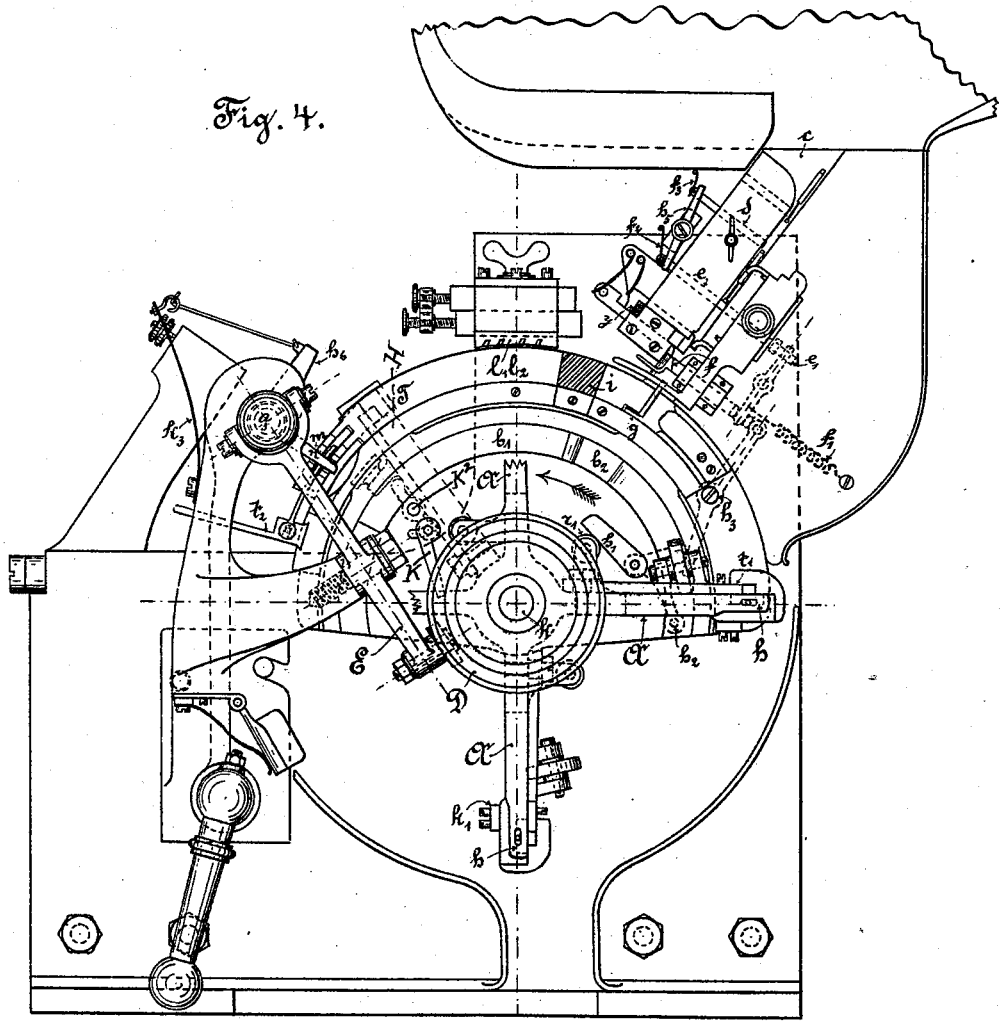
Witnesses:     Inventor:

(No Model.)

G. F. GIESECKE.
TYPE FINISHING MACHINE.

No. 540,656.

8 Sheets—Sheet 2.

Patented June 11, 1895.

(No Model.) 8 Sheets—Sheet 3.

G. F. GIESECKE.
TYPE FINISHING MACHINE.

No. 540,656. Patented June 11, 1895.

Witnesses:

Inventor:

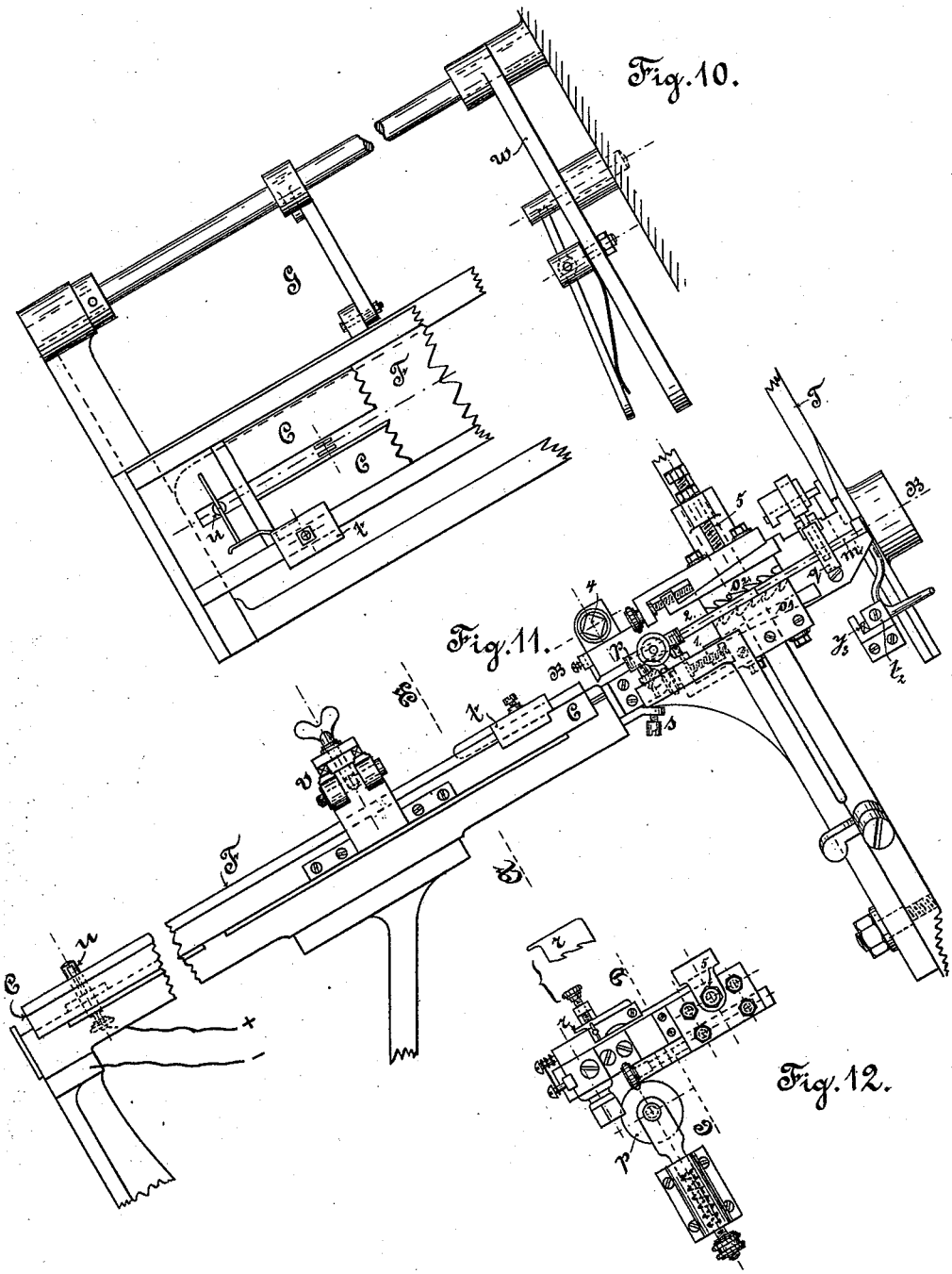

(No Model.) 8 Sheets—Sheet 5.

G. F. GIESECKE.
TYPE FINISHING MACHINE.

No. 540,656. Patented June 11, 1895.

Witnesses: Inventor:

(No Model.) 8 Sheets—Sheet 6.

G. F. GIESECKE.
TYPE FINISHING MACHINE.

No. 540,656. Patented June 11, 1895.

Witnesses:

Inventor:

(No Model.) 8 Sheets—Sheet 7.
G. F. GIESECKE.
TYPE FINISHING MACHINE.
No. 540,656. Patented June 11, 1895.
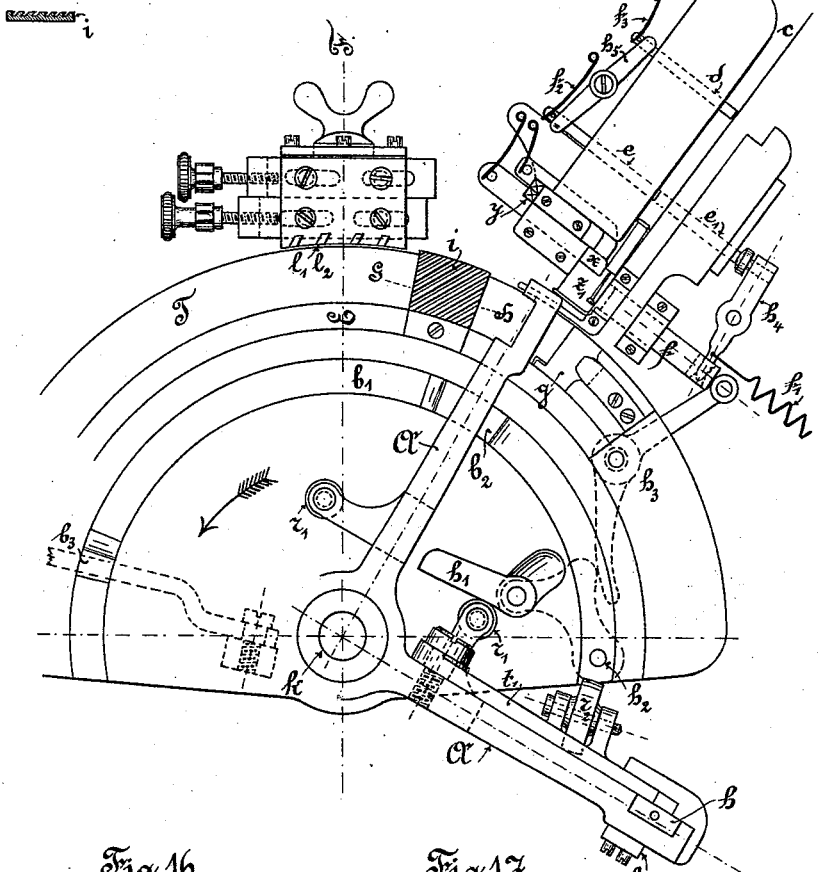
Fig. 22.
Fig. 15.
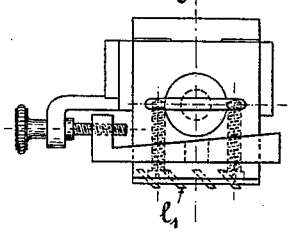
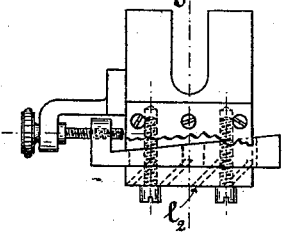
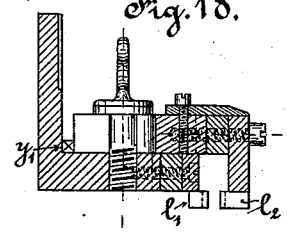
Fig. 16.
Fig. 17.
Fig. 18.
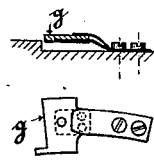
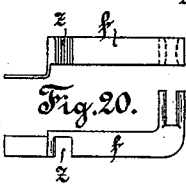
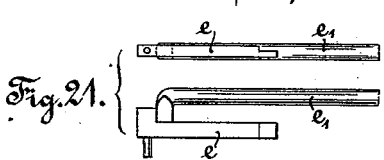
Fig. 19.
Fig. 20.
Fig. 21.
Witnesses:
Max C. Schulze
Rud. E. Fricke
Inventor:
George F. Giesecke (No Model.) 8 Sheets—Sheet 8.

G. F. GIESECKE.
TYPE FINISHING MACHINE.

No. 540,656. Patented June 11, 1895.

Witnesses:
Max C. Schulze
Rud. E. Fricke

Inventor:
George F. Giesecke

UNITED STATES PATENT OFFICE.

GEORGE F. GIESECKE, OF LEIPSIC, GERMANY.

TYPE-FINISHING MACHINE.

SPECIFICATION forming part of Letters Patent No. 540,656, dated June 11, 1895.

Application filed February 15, 1894. Serial No. 500,254. (No model.)

*To all whom it may concern:*

Be it known that I, GEORGE F. GIESECKE, residing at Leipsic, in the Kingdom of Saxony, Germany, have invented a Type-Finishing Machine, of which the following is a specification.

This machine which is designed to finish the cast types, is characterized in the following description, to which relate the twenty-nine figures on the eight drawing sheets annexed to the present.

Figure 5:
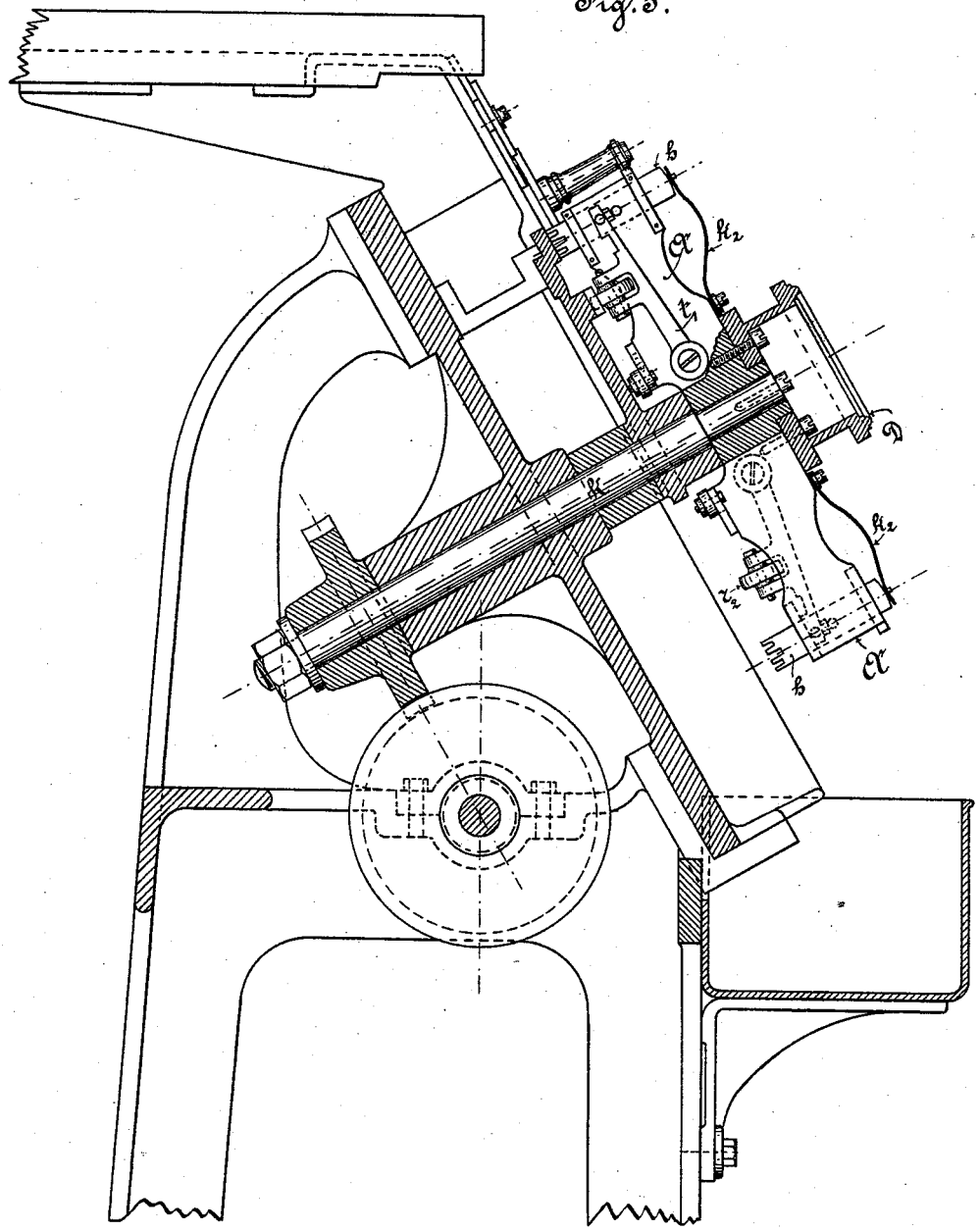
Figure 6:
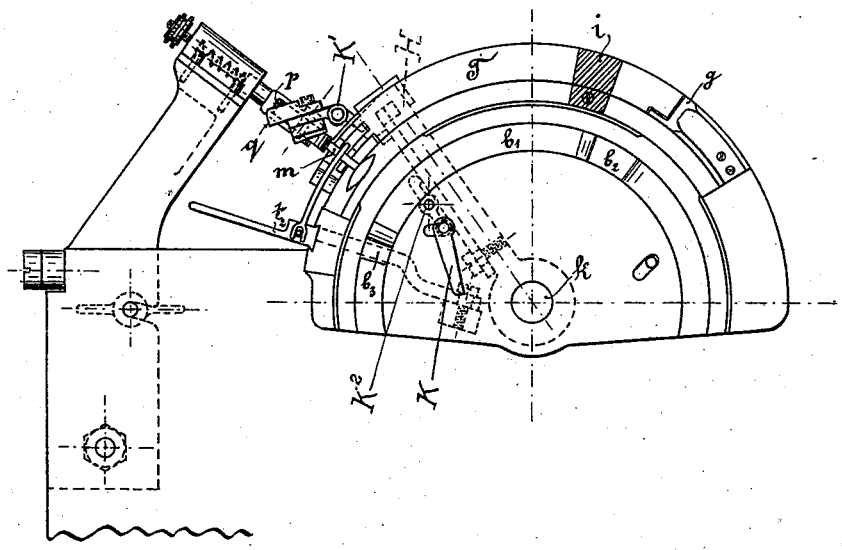
Figure 7:
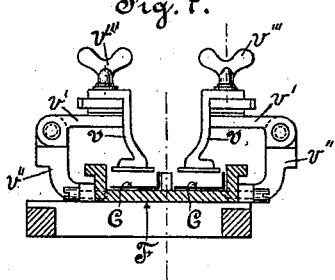
Figure 8:
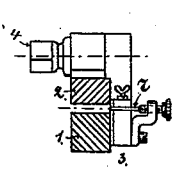
Figure 9:
Figure 13:
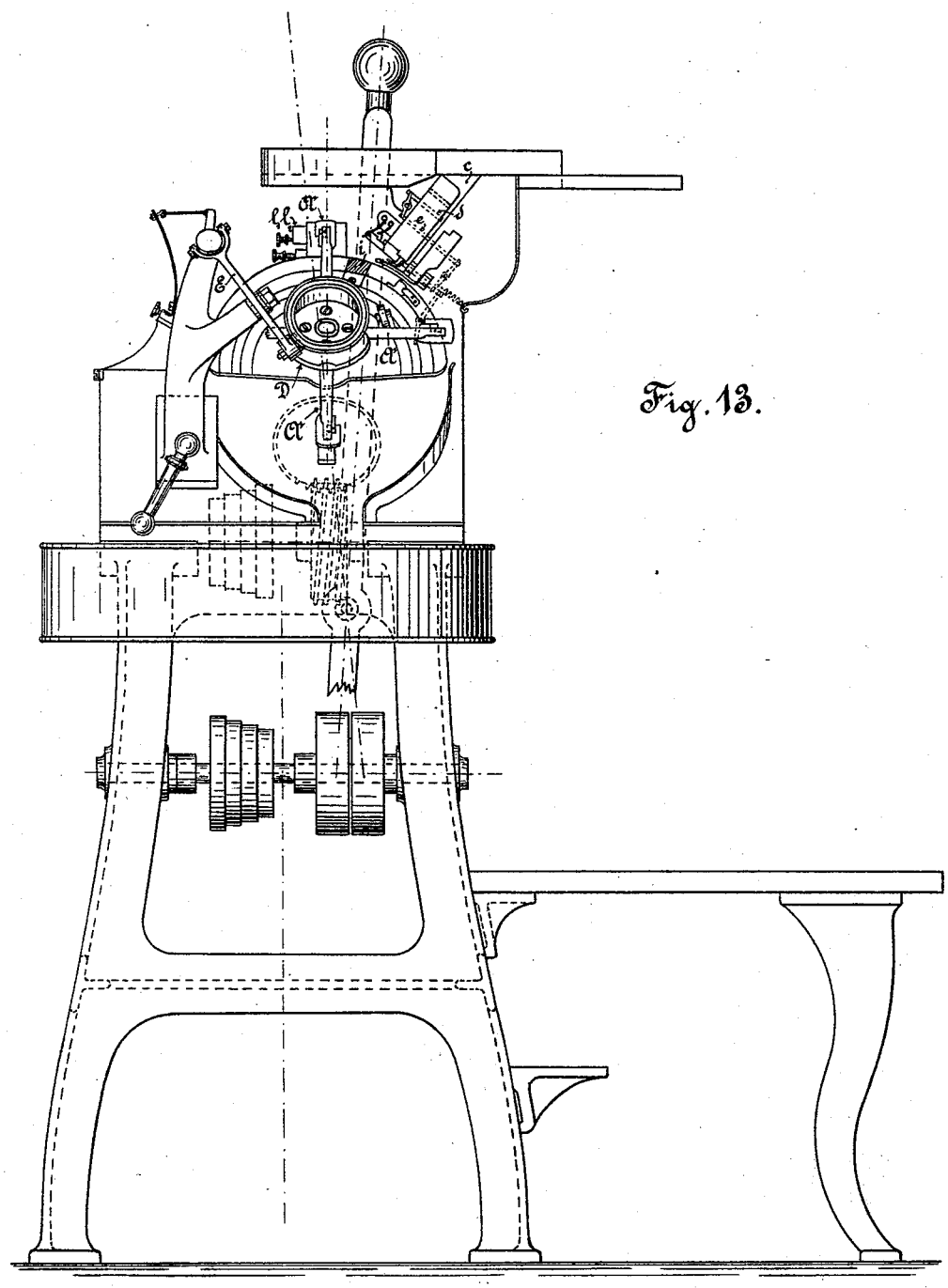
Figure 23:
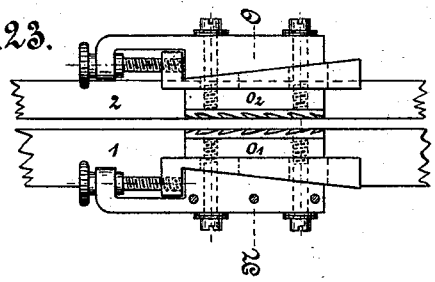
Figure 24:
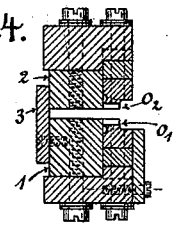
Figure 25:
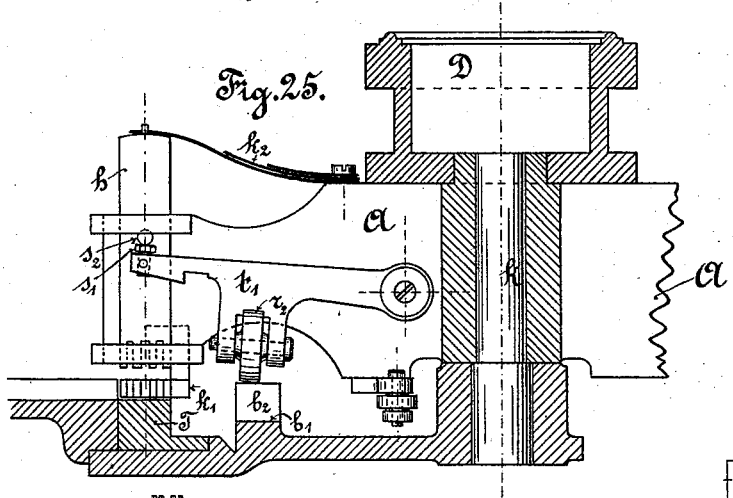
Figure 26:
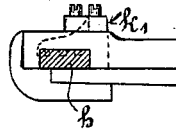
Figure 27:
Figure 28:
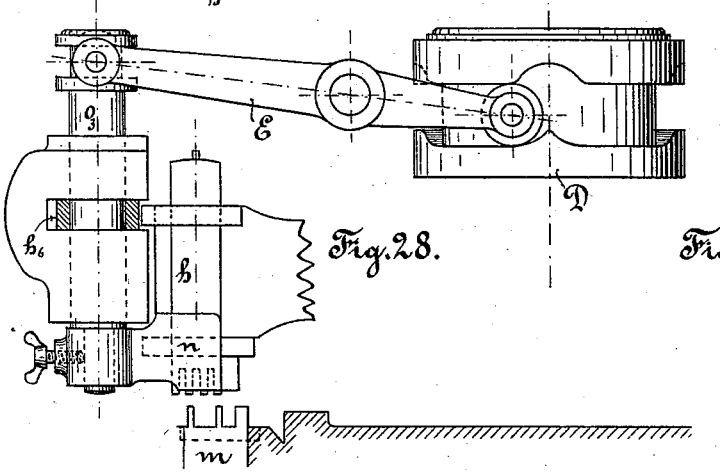
Figure 29:

In the drawings, Figures 1 and 2 represent edge and face views of type before finishing; Fig. 3, type after being finished with the jet removed to one side. Fig. 4 represents an end view of the finishing-machine; Fig. 5, a transverse median section of the machine; Fig. 6, a detailed face view of a portion of the parts shown in Fig. 4; Fig. 7, a detail section on line A B, Fig. 11, looking to the left; Fig. 8, a detail section of part of Fig. 12 on the line C D, looking to the left. Fig. 9 is a detail showing the knife $s$. Fig. 10 is an enlarged plan view of parts of the type-setting-up apparatus shown at the left end of Fig. 11 and the lever $w$. Fig. 11 is a side view of the type-setting-up apparatus and adjuncts. Fig. 12 is an enlarged detail plan view of part of the type-setting-up apparatus. Fig. 13 is a front view, and Fig. 14 a side elevation, of the device; Fig. 15, an enlarged detail view of Fig. 4. Figs. 16, 17, and 18 are plan and sectional views of knives $l'$ and $l^2$ and their adjustment. Figs. 19 and 20 are views of the spring-holder $g$. Fig. 21 shows views of the finger $e$. Fig. 22 is a sectional view of the knives $i$, Fig. 15. Figs. 23 and 24 are top and sectional views of part of the type-setting-up apparatus, showing the knives $o'$ and $o^2$; Fig. 25, an enlarged detail view partly in section, showing the finger $h$ and parts for operating it. Figs. 26 and 27 are views of the type-carrier $k'$. Fig. 28 is an enlarged view of the driver $n$ and parts for operating it. Fig. 29 is a detail edge view of the finger $h$, showing a type beneath it.

The cast letter-types, as they are turned out by the casting machines, possess the form shown by Figs. 1 and 2, having a jet $a$ and, on the four sides of the face, a projecting burr $b\ b$, so that they cannot, in their present state, be placed, accurately fitting one to another, in the form. They must, on the contrary, be first freed from these superfluous parts and disturbing inequalities, so that the finished type may present the appearance shown in Fig. 3. Now this jet is frequently broken off from the types by hand and the burr removed by rubbing on files or stones, a labor which involves a great waste of time, is extremely troublesome in the case of small types and, which is the main point, can never be performed accurately. There are already, it is true, different rubbing machines, but these do the work partially and even then defectively. I have now constructed and practically tested a machine, which performs this work with the utmost neatness, first breaking off the jets; secondly, planing the types at the shoulder to exactly the same width; thirdly, planing them to exactly the same body at the shoulder; fourthly, grooving out the place where the jet was broken off, and, fifthly, setting up the types accurately in a continuous line in a stick.

This machine is shown in the accompanying drawings, Figs. 4 to 29, and the construction of the machine is as follows:

The types Figs. 1 and 2 with the jets $a$ downward are inserted in the machine at $c$, Fig. 4, on the sloping drop board, and are automatically transported farther by the machine. To prevent the face of the type from being injured by the next following one, a finger $d$ at once places itself against the second type, while the first type glides down on to the finger $e$. The finger $e$ now draws back, the type falls with its jet till in front of the stop $x$, Fig. 15, which is set to the thickness of the body of the type under operation by means of a type of equal thickness to be inserted at $y$, Fig. 15, so that the type under operation is prevented from falling farther. The breaker $f$, Fig. 15, now advances upward toward the left, breaks off the jet, which falls through the hole $z'$, from the type, and pushes the stop $x$, held by a spring, so far back that the type is set free and can slip through the aperture $z$, Fig. 20, in the breaker $f$, so as then to reach the spring catcher $g$. The arrangement and form of the fingers $d$ and $e$, of the breaker $f$ and the catcher $g$, are shown on Figs. 15, 19, 20 and 21.

The parts $d$, $e$ and $f$ are set in motion by the four armed rotary cross A, Fig. 15, which actuates them in the following manner:

While the cross is turning in the direction of the arrow, the roller $r'$ attached to the cross runs against the lever $h'$, turning it round the point $h^2$. This motion is transmitted to the breaker $f$ by the bent lever $h^3$. The fingers $d$ and $e$ are then simultaneously brought into position by the double levers $h^4$ and $h^5$. After the roller $r'$ has left the lever $h'$, the springs $f'$, $f^2$ and $f^3$ draw the parts $d\ e$ and $f$ back again into their original position. As may be seen from Fig. 15, the application of the fingers $d$ and $e$ is alternate, so that the types are held one by $d$ and another by $e$, in order that the types may arrive at the breaker $f$ singly and without touching one another. The spring catcher $g$ mentioned above is specially shown on Fig. 19.

Now, while the machine is working, the four armed cross A with the carriers $k'$ and the fingers $h$ turn only in the one direction from right to left as shown by the arrow, round the axle $k$, Figs. 4 and 5, and Figs. 15 and 25. One such carrier $k'$, Figs. 25 and 27, carries the letter away from the catcher $g$, while the finger $h$ is raised, the manner of doing so being the following: Opposite $g$ there is, on the concentric roller track $b'$ a projection $b^2$, Figs. 15 and 25. Now, while the roller $r^2$, Fig. 25, is passing over the projection $b^2$ on the track $b'$, the finger $h$ will be raised by the lever $t'$ and the screw $s'$, which strikes against the pin $s^2$, and on leaving the projection $b^2$, will fall again by the pressure of the spring $k^2$, on the letter which lies on the type track T and is pushed from behind by the carrier $k'$. Previously to this the spring catcher $g$ was pressed down by the moving carrier $k'$, which took away the letter with it. If there is no type under the finger $h$, the concentric roller track $b'$ will prevent the finger $h$ from sliding directly on the type track T. As the four armed cross A continues to move, the finger $h$ and the carrier $k'$ screwed on to A, Figs. 25, 26 and 27, will carry the letter on to the concentric type-track T, Fig. 15, dragging the letter over the knives $i$, Figs. 15 and 22, by which the burr on the one side is removed. Thereupon the type, which projects with its shoulder or with the attached burr $b\ b$, Figs. 1 and 2, over the type-track T, is pressed through between the knives $l'$ and $l^2$, Figs. 15, 16, 17 and 18, which cut away the burr $b\ b$. The knives $l'$ and $l^2$ shown in Figs. 15 to 18, may be accurately adjusted by screw and wedge, it being imperative that the upper cutting edge of the lower knife $l'$ should lie exactly in the plane of the type track T. The upper knife $l^2$ is adjusted accurately to the thickness of the type by means of an identical type inserted at $y'$, Fig. 18. The relative position of the two knives is fixed by a thumb-screw. Carried farther along the concentric track, the letter then arrives in the opening $m$, Figs. 4, 6, 11 and 28, of a channel B B, running in a slanting direction backward and downward, its continuation being formed by an angle-iron stick C C in the setting up apparatus F, Figs. 7, 10 and 11. Before the type arrives in front of the opening $m$, the finger $h$ on the four armed cross A is raised by the roller $r^2$ running up on to a projection $b^3$ Figs. 6 and 15 in the same way as above described, thus setting the letter free; but in order that the carrier $k'$ may also set the letter free, the type track T is sloped down toward $m$, as shown by Fig. 11. The transport on this sloping surface until shortly before reaching the opening $m$ is still effected by the finger $h$, this finger and the carrier $k'$ passing on over the type which lies in front of the opening $m$. The last mentioned projection $b^3$ must be adjusted every time upward or downward to the thickness of the type under operation, for which purpose this projection $b^3$ is connected with a lever $t^2$, Fig. 11, lying beneath the plate, beneath which lever at $y^3$, Fig. 11, the type of corresponding thickness is inserted, thus fixing the height of $b^3$. Until in front of the opening $m$, the types under operation are so led by the machine that they do not touch each other, but are pushed singly over the knives $i$ and between the knives $l'$ and $l^2$. Here, however, at the opening $m$ of the channel B B, Fig. 11, the types on the contrary come together and are pressed by the driver $n$, Fig. 4, into the channel B B, so that the letters form a continuous row with the faces to the front. The driver $n$ is actuated by the lever E, Fig. 28, which slides with a roller in the curved groove of a cam D, Figs. 25 and 28, which turns with the four armed cross A around the axle $k$. On the axle $o^3$ of the driver $n$ there is also fixed a lever $h^6$, Figs. 4 and 28, which is struck every time by a finger-like projection on the arm of the cross A, thus turning the lever with the driver $n$. When the bent lever $h^6$ is again set free, it is then, along with the driver $n$, drawn back into its original position by means of a spring $k^3$, whereupon the grooved cam D and the double lever E again set the driver $n$ in action. The following types now push the preceding types in the channel B B slowly along between the knives $o'$, $o^2$, Fig. 11, and Figs. 23 and 24, which knives are also adjustable by means of screw and wedge, by which process the letters are freed from the burr and superfluous material on the surfaces of the body.

The channel B B is formed of a fixed bottom 1, of a cover 2, Figs. 23 and 24, adjusted and held in position by screws 4 and 5, Fig. 11, and of a back wall 3, firmly connected with the bottom. The types lie in the channel B B with their feet toward the back wall 3, while the shoulders project beyond the bottom 1 and the cover 2, on the front surfaces of which are the knives $o'$ and $o^2$. Behind the knives $o'$ and $o^2$, opposite the press roller $p$, Figs. 11 and 12, is fixed another knife $r$, Figs. 8 and 12, projecting through the back wall 3, which knife, as the types pass it, cuts a groove into them at the place where the jet was broken off, thus removing all irregularities at this point also. By means of a little hammer $q$, Figs. 6 and 11 placed near the opening, $m$, to drive the type against the back wall of the channel, B B, and the press roller $p$, Figs. 11 and 12, the type are kept constantly pressed against the back wall 3 of the channel B B.

At the end of the channel B B in its bottom 1 lies another adjustable knife $s$, Figs. 9 and 11, which planes any further supplementary nicks, that may be required in the type, Fig. 2. From this point the type enters the angle-iron stick C C, over which is a cover $v$, Figs. 7 and 11, to prevent the letters from springing out. The cover, $v$, is attached to an arm, $v'$, pivoted to a bracket, $v''$, on the side of the stick, C. The cover is made adjustable vertically by a screw, $v'''$, to suit the thickness of the type.

The movement of the little hammer, $q$, is caused by a swinging lever H, (Figs. 4 and 6), situated under the main plate, and which is pushed backward by means of the double armed lever, K, attached to a small shaft that passes through an oblong slot in the main plate, to admit of a sliding movement of the shaft. The under arm of said lever K is pivoted to the plate at $K^2$. The rollers, $r'$, as they are carried forward by the arms of the cross move the upper arm of lever, K, which causes the under arm to shove the lever, H, away from the double armed lever, K'. When the rollers, $r'$, have passed the end of lever, K, the lever, H, falls back again by its own weight and strikes with its exterior end on the descending arm of the double armed lever, K' (Fig. 6), whereby the horizontal arm of the latter bearing the hammer, $q$, is lifted. The hammer, $q$, while the swinging lever, H, is turned toward the right, rests on the type, and presses them toward the foot plate, 3, (Fig. 24,) of the path, B B (Fig. 11), and, as soon as it is lifted by K', releases the type which now, by the succeeding type, are pressed farther below and between the knives, O $O^2$. As can be perceived clearly by the Figs. 6, 11 and 12, the forcing roll, $p$, in pressing on the type, is totally independent of the hammer, $q$, and has only the purpose to press the type during their passage by the opposite planing iron, $r$ (Fig. 12), toward the back foot plate, 3, of the path, B B. The forcing roll is pressed toward the type by an adjustable spiral spring, situated in one of the arms of the frame, (Figs. 6, 11 and 12.)

Referring to the lever, $t^2$ (Figs. 4, 6 and 11), situated behind the main plate, it is firmly connected with the curved elevation, $b^3$, which is placed in an opening of the main plate, so that by means of the higher or lower adjustment of the lever, $t^2$, it (the elevation) projects more or less from the path, $b'$, of the lever roll, $r^2$. Consequently, as soon as the roll, $r^2$, runs over the elevation, $b^3$, the finger, $h$, is lifted by means of the lever, $t'$, screw, $s'$, and pin, $s^2$, whereby the type arrived before the mouth, $m$, is released. The position of the lever, $t^2$, necessary to this release of the type is effectuated by the insertion of a suitable type between the lever, $t^2$, and a firm rest on the frame at $y^3$ (Fig. 11).

The lever, $h^6$, is an angle lever and firmly fixed on the rotatory axles, $O^3$ (Fig. 4), in a niche of the bearing block supporting said axle. One arm of $h^6$ stands upright and is connected with spring, $K^3$, while the other arm of $h^6$ is forming, with the former, nearly a right angle and, in its resting position, points, similar to the type driver, $n$, toward the direction of the axle, K. The type driver, $n$, is likewise fastened on $O^3$, so that, when the parallel arm of $h^6$ is turned aside by the thumb formed projection at the arm of the rotary cross, A, it must follow this direction of rotation. Hereby the finger, $h$, and the driver, K', are prevented from striking toward the type driver, $n$, as the cross, A, is moving on.

One of the two sticks C C is always in front of the outlet to the channel B B in order to receive the successively finished types. When, after some time, the entire stick C C is filled with types, this is signaled to the attendant by the ringing of a bell, caused by the contact of a slide $t$ in the stick C C striking against an electric pin $u$, Fig. 10, whereupon the empty stick, which is lying ready, is pushed forward into the place of the full one by means of the lever $w$, Fig. 10.

Figure 14:
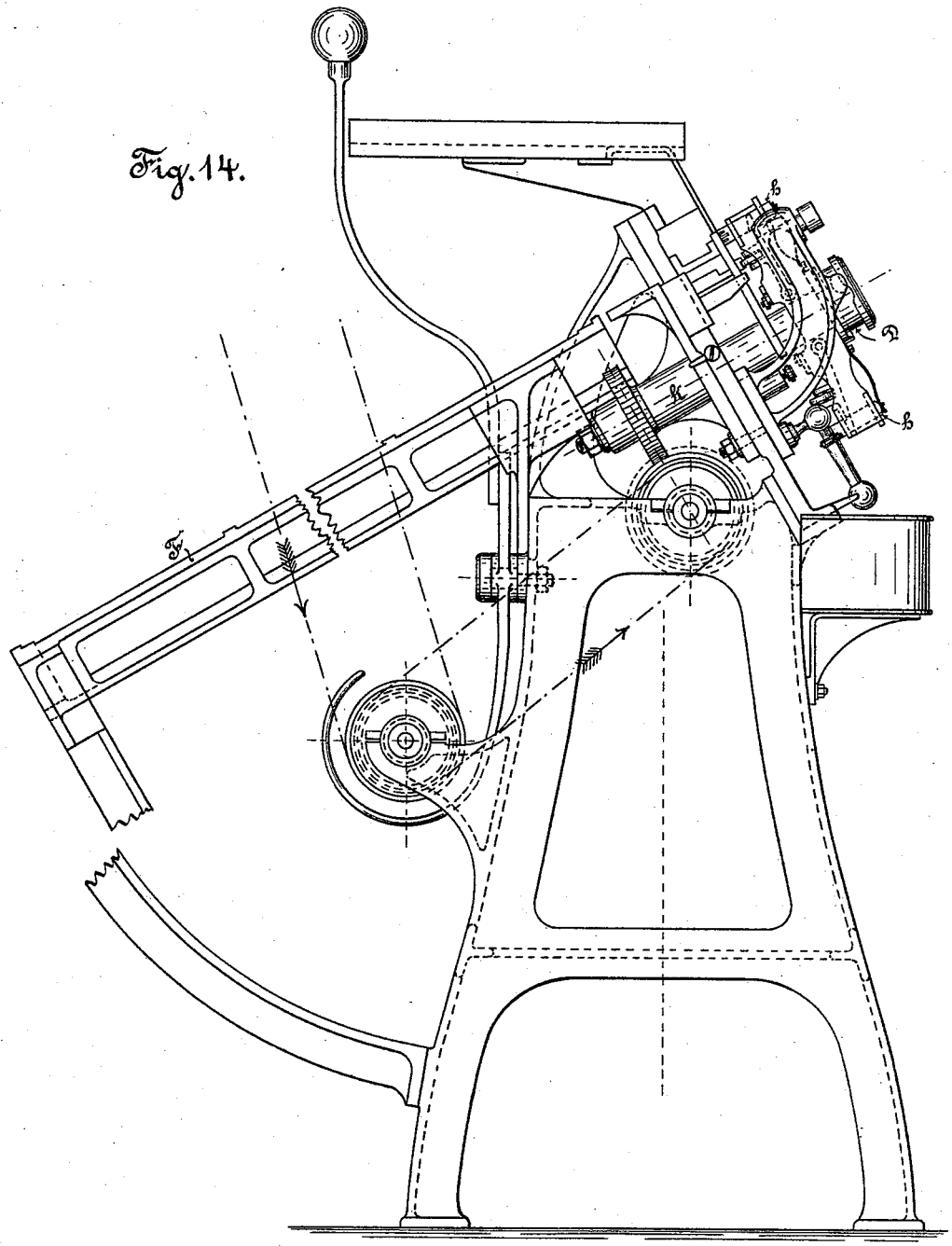

The complete form of this type finishing or dressing machine is shown in front and side elevation on Figs. 13 and 14.

The entire machine is actuated by belts, (Fig. 14,) worm and worm wheel, which set the cross A, (Figs. 5, 13 and 14) in motion. Above the cross sits a cam D, which sets the driver $n$ in motion by means of a double lever E, Figs. 4 and 28. By means of bent levers the same cross sets the drop mechanism with its fingers $d$ and $e$ and breaking-off apparatus $f$ in motion, as shown by Figs. 4 and 15.

The types enter the sticks, C and C' (Fig. 10), which rest on a slide, F (Fig. 10). One of the two sticks is always in front of the outlet of the channel, B B, in order to receive the finished types. When one of the sticks is filled, the slide is moved on its base, X (Fig. 10), by means of the lever, $w$, and two links, of which only the one, Y, is shown in the drawings in the direction of the arrow, thus bringing the filled stick away from the outlet, B B, and the empty one in front of the outlet. The moment when one stick is filled is signaled to the attendant, by the ringing of a bell, caused by the contact of the slides, $t$ and $t'$ (only one is shown in the drawings) which press against the type and which are moved along with the type, until the contact of $t$ and $t'$ strikes the other contact at U. Over the sticks is a cover, V (Figs. 7 and 11), which prevents the letters from springing out.

I claim—

1. The combination of the sloping trough, $c$; the fingers, $d$ and $e$, on the lever, $h^5$; the series of levers, $h'$ $h^3$ $h^4$ and $h^5$, and the rollers, $r'$, on the arms of the cross, A, for operating such fingers through the levers, as set forth.

2. The combination of the spring catch, $g$, below the channel, $c$; the channel $c$ the stop, $x$, near the bottom of the channel, $c$, and the breaker, $f$, opposite to the stop, $x$, operated by the lever, $h^3$, and springs, as described.

3. The combination of the rotary cross, A, having on the arms the rollers, $r^2$; the roller track, $b'$, having on it the projections, $b^2$; the type carriers, $k'$, and type fingers, $h$, on the ends of the arms of the cross, A, as set forth.

4. The combination of the circular type track, T, sloped toward its end, with knives, $i$, burr removing knives, $l'$ and $l^2$, placed above the track, the type channel, B, at the end of the track, T, perpendicular thereto, and slanting downward, the opening, $m$, the finger, $h$, and type carrier, $k'$, on the end of the cross, A, the grooved cam, D, the lever, E, the reciprocating holder, $O^3$, and the type driver, $n$, all substantially as and for the purpose described.

5. The self acting setting up apparatus, consisting of a trough, C C, a slide, $t$, thereon, an electric alarm pin, $u$, said pin and slide being, respectively, connected to the terminals of an electric apparatus, and a lever, $w$; substantially as set forth.

6. The combination of the cross "A" a lever, $t'$, pivoted to each arm of the cross and having a roller, $r^2$, underneath and a screw, $s'$, on the outer end, the projections $b^2$ and $b^3$, on the track, $b'$, for lifting the lever as it passes them, the finger $h$ in each arm of the cross A the pin, $s^2$, on said finger, whereby the finger is lifted as the lever, $t'$, passes the projections, $b^2$ and $b^3$, and the check spring, $k^2$, by which the finger is restored to its position after passing $b^2$ and $b^3$, all substantially as and for the purpose described.

7. The combination of the rotary cross, A, having in each arm a roller, $r^2$; the double armed lever, K, the upper arm of which is operated by the roller, $r^2$; the swinging lever, H, moved by the under arm of the lever, K; and the double armed lever, K', bearing the hammer, $q$, on one arm, the other arm being operated by the return movement of the swinging lever, H, all substantially as described.

8. The combination of the type channel, B B, the hammer, $q$, pressure roller, $p$, spiral spring, $p'$, controlling the roller, $p$, all located at the entrance, to the channel, B B; the upper knife, $r$, and under knife, $s$, between which the types pass for trimming, substantially as and for the purpose described.

In testimony whereof I have signed my name to this specification in the presence of two subscribing witnesses.

GEORGE F. GIESECKE.

Witnesses:
MAX C. SCHULZE,
RUD. E. FRICKE.